(12) United States Patent
Alkhamis

(10) Patent No.: US 6,422,016 B2
(45) Date of Patent: Jul. 23, 2002

(54) ENERGY GENERATING SYSTEM USING DIFFERENTIAL ELEVATION

(76) Inventor: Mohammed Alkhamis, PO Box 85069, Riyadh 11691 (SA)

( * ) Notice: Subject to any disclaimer, the term of this patent is extended or adjusted under 35 U.S.C. 154(b) by 0 days.

(21) Appl. No.: 09/859,524

(22) Filed: May 18, 2001

Related U.S. Application Data

(63) Continuation-in-part of application No. 09/251,152, filed on Feb. 17, 1999, which is a continuation-in-part of application No. 08/887,604, filed on Jul. 3, 1997, now Pat. No. 5,873,249.

(51) Int. Cl.$^7$ .............................................. F01K 27/00
(52) U.S. Cl. ........................................ 60/641.1; 60/675
(58) Field of Search ...................... 60/639, 675, 641.1

(56) References Cited

U.S. PATENT DOCUMENTS

| | | |
|---|---|---|
| 1,085,703 A | 2/1914 | Rochelle |
| 3,953,971 A | 5/1976 | Parker |
| 4,187,686 A | 2/1980 | Pommier |
| 4,318,275 A | 3/1982 | Brown et al. |
| 4,393,653 A * | 7/1983 | Fischer .......................... 60/511 |
| 4,432,203 A * | 2/1984 | Fischer .......................... 60/511 |
| 4,760,706 A | 8/1988 | Nasser |
| 5,255,519 A | 10/1993 | Kakovitch |
| 5,488,828 A | 2/1996 | Brossard |

* cited by examiner

*Primary Examiner*—Hoang Nguyen
(74) *Attorney, Agent, or Firm*—Larson & Taylor, PLC

(57) ABSTRACT

A system generates energy using the difference in elevation between an upper elevation (e.g., at the top of a mountain) and a lower one (e.g., at or near the bottom of the mountain.) The system includes a compressor located at the upper location which supplies compressed gas through a conduit to a mixing chamber at the lower elevation. A plurality of turbine-generator sets are located at different elevations along the conduit for extracting energy from the compressed gas. A control unit connected to the conduit supplies pulses of the compressed gas to the mixing chamber for mixing with mercury to produce a mercury-gas mixture. An injector injects pulses of the mercury-gas mixture into a turbine so as to impact against the turbine blades and drive the turbine.

16 Claims, 1 Drawing Sheet

ENERGY GENERATING SYSTEM USING DIFFERENTIAL ELEVATION

RELATIONSHIP TO OTHER APPLICATIONS

The present application is a continuation-in-part application of Ser. No. 09/251,152, filed on Feb. 17, 1999, which is itself a continuation-in-part of application of Ser. No. 08/887,604, filed on Jul. 3, 1997 and now U.S. Pat. No. 5,873,249.

FIELD OF THE INVENTION

The present invention relates to an improved energy generating system which, in part, derives or generates energy based on as large differential elevation between different parts of the system.

BACKGROUND OF THE INVENTION

It is an understatement to say that an extremely large amount of research has gone into developing existing energy sources, as well as exploring alternative energy sources such as solar, tidal and wind energy.

As indicated above, the present invention is concerned, in part, with using the difference in elevation between different parts of the system in generating energy. Patents of interest in this particular field include the following U.S. Pat. Nos. 3,953,971 (Parker); U.S. Pat. No. 5,255,519 (Katovitch); U.S. Pat. No. 4,760,706 (Nasser); U.S. Pat. No. 5,488,828 (Brossard); U.S. Pat. No. 4,318,275,(Brown et al); U.S. Pat. No. 4,187,686 (Pommier); and U.S. Pat. No. 1,085,703 (Rochelle).

Briefly considering these patents, the Parker patent discloses a system for generating power wherein liquid stored at a higher elevation travels down a conduit to a power generation unit at a lower elevation. The liquid is then vaporized and heated before traveling up a conduit back to the higher elevation where the vapor condensed to a liquid for reuse. The Katovitch patent discloses a power generation system wherein helium is utilized as a working recycled fluid which is heated to convert the fluid to a vapor form for powering a generator. The Nasser, Broassard, and Brown et al patents each disclose a power generation system wherein a coolant is evaporated at a lower position, allowed to rise via tubing to a higher position, liquefied at the higher position, and then allowed to flow down to the lower reposition where the liquid drives a turbine connecting to a generator. The Pommier patent discloses a power generation system wherein fluid is warmed at a lower level to convert the fluid to a gas and cooled at an upper level to convert the gas back to a fluid. The hydraulic pressure of the liquid moving from the upper level to the lower level is used to generate power. The Rochelle patent discloses a water motor which utilizes a water, and gravity, to pull down buckets from an upper elevation and thereby generate energy.

SUMMARY OF THE INVENTION

In accordance with the invention, an energy generating system is provided which, in part, derives or generates energy based on a large differential in elevation between different parts of the system, e.g., between parts of the system located at or near the top of a mountain and other parts of the system located at or nears the bottom of the mountain. Among the suitable candidate locations for the system is the mountain of Sarawat in the Kingdom of Saudi Arabia which is a relatively high mountain having a steep face, about 2400 m. above sea level.

In accordance with the invention, a system is provided for generating energy using the difference in elevation between a relatively high elevation and a relatively low elevation, the system comprising: a compressor located at the relatively high location for compressing a vapor form of a working medium into a compressed gas; a first conduit for conveying the compressed gas to the relatively low elevation; a mixing chamber at the relatively low elevation; mercury supply means for supplying mercury to the mixing chamber; control means connected to the first conduit for supplying pulses of the mercury-gas mixture into the turbine so as to impact against the turbine blades and drive the turbine; separator means for recovering the mercury and gas from the turbine and for separating the gas from the mercury; connector means for conveying mercury separated from the gas to the mercury supply means; and a further conduit for conveying gas separated from the mercury to the compressor.

Preferably, the control means comprises a control valve connected to said conduit and having an open state wherein the compressed gas is supplied to said mixing chamber and a closed state wherein the compressed gas is blocked from the mixing chamber, and an electrical control means for providing periodical opening and closing of the control valve to generate said pulses. Advantageously, the valve comprises a rotary valve.

The mixing chamber preferably includes an internal electric heater for heating the mercury and gas supplied to the chamber. The injecting means preferably includes a connection between the mixing chamber and the turbine for increasing the rate of injection of the mercury-gas mixture into said turbine.

Preferably, the system further comprises heating means for heating the mercury prior to supplying of the mercury to the mixing chamber. The heating means preferably comprises at least one heater tank containing mercury, and supply means for supplying gas from the separator means to a bottom portion of the tank such that the gas bubbles up through the mercury in the tank to thereby cause heating of the mercury. Advantageously, the separator means comprises a separator tank containing mercury and defining a mercury level, the separator tank including an inlet connected to said turbine, an outlet disposed below the mercury level for supplying mercury to the at least one heater tank, and an outlet at an upper portion of said separator tank for supplying gas to said at least one heater tank.

In a preferred implementation of the embodiment described above, at least one heater tank comprises a plurality of interconnected heater tanks arranged in serial relation and disposed at different, increasing levels or elevations, in sequence, beginning with the heater tank connected to the separator tank. The system preferably further comprises a gas pipe connector for connecting each heater tank to the next adjacent tank in sequence, and an electrically controlled, cyclically operated rotary valve connected in each gas pipe connection. Advantageously, the rotary valves are controlled to cyclically operate at different, decreasing rates beginning with the heater to the separator tank. Preferably, these rates decrease, in sequence, by a factor of two, beginning with the heater tank connected to said separator tank.

The supply means preferably comprises a connection conduit of a first diameter connected to the separator tank and a plurality of connecting pipes of diameters smaller than said first diameter connected between the connector conduit and the bottom portion of the heater tank. Advantageously, each of the pipes includes an outlet end opening into the heater tank and an air filled float valve located at the outlet end.

The mixing chamber preferably includes an ovoid shaped cavity. Advantageously, the mixing chamber includes an ovoid shaped heater therein.

Other features and advantages of the invention will be set forth in, or apparent from, the detailed description of the preferred embodiments of the invention which is found hereinbelow.

BRIEF DESCRIPTION OF THE DRAWINGS

The single FIGURE in the drawings is a schematic diagram of an energy generating system in accordance with a preferred embodiment of the invention.

DESCRIPTION OF THE PREFERRED EMBODIMENTS

Figure 1:
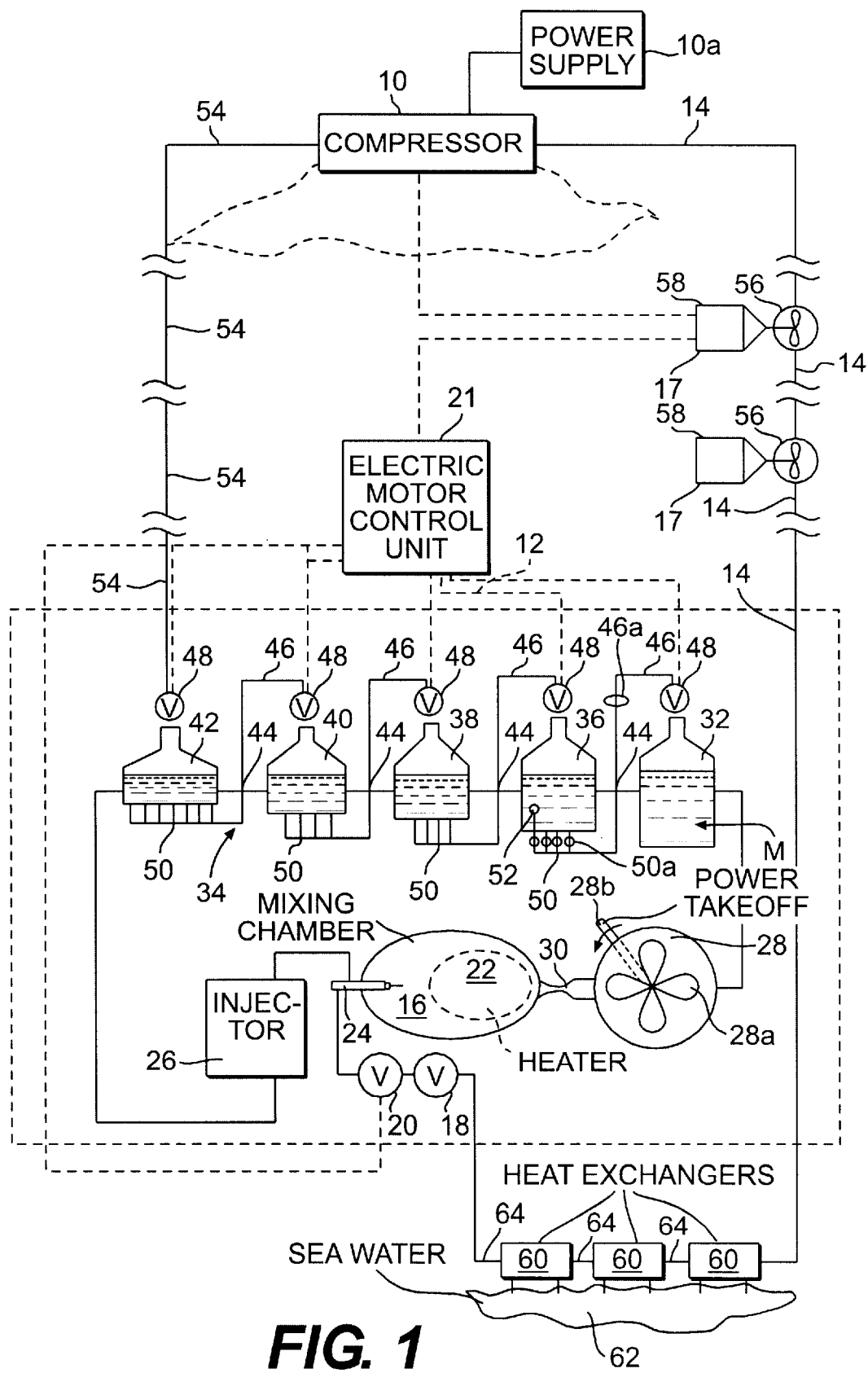

Referring to the drawings, there is shown a schematic representation of an energy generating system in accordance with a first embodiment of the invention. The system includes a compressor 10 located at or near the top of a mountain or, more generally, at a high relative differential elevation with respect to the rest of the system, the latter being indicated as a unit denoted 12.

Compressed gas is conveyed from the compressor 10 down the mountain through a supply line 14 to a mixing chamber 16 of unit 12. Connected in the supply line 14 at various spaced points along the descent thereof down the mountain are turbine-generator units 17 described in more detail hereinbelow. A main valve 18 connected in supply line 14 upstream of chamber 16 serves, when closed, to block the gas in line 14 from reaching chamber 16. An electrically driven rotary ball valve 20, connected in line 14 between valve 18 and chamber 16, is driven by an electric motor control unit 21 which also drives additional rotary ball valves described below.

Mixing chamber 16, which is, as shown, preferably "egg-shaped" or elliptical, includes an electric heater 22 which is also preferably egg-shaped, as shown, and which, in use, heats the contents of chamber 16. The volume of the chamber 16, or, stated differently, the distance between the longitudinal center line of the chamber and the inner wall surface, is selected to be the greatest at the center of the chamber and the smallest near the chamber outlet. An injector nozzle 24 receives compressed gas from line 14 as well as hot mercury from an injector unit 26. The heater 22 heats both the gas and mercury in chamber 16 and the hot mixture is supplied from chamber 16 in shock waves or pulses controlled by rotary valve 20. In particular, the timing and duration of these shock waves or pulses is controlled by opening and closing times of valve 20 under the control of the electric motor control unit 21 referred to above.

A turbine 28 is connected to chamber 16 through a venturi connection 30, and is driven by the shock waves, or pulses, of the hot mixture of mercury and gas referred to above. The venturi connection 30 accelerates the flow rate of the mixture. The distance between the turbine 28 and mixing chamber 16 should be chosen to provide the maximum rate of speed for the pulses of the mercury and gas mixture so as to exert the optimum force on the turbine 28. Further, the blades 28a of the turbine 28 should be shaped so as to maximize the driving force produced thereon by the pulses. The overall operation of this aspect of the system is roughly similar to that of an air gun wherein pulses of air are used to generate propulsive forces. A power take-off shaft for turbine 28 is indicated at 28a.

The compressed gas and mercury in turbine 28 are recycled from the turbine to a separation tank 32 wherein the gas rises to the top and the mercury, indicated at M, collects at the bottom of the tank. Separation tank 12 is connected to a system of further heater tanks, generally denoted 34. These tanks are of different sizes and are disposed at different levels, as shown. In the embodiment illustrated, four tanks 36, 38, 40 and 42 are employed. The mercury M from separation tank 32 is transferred in the other tanks, in sequence, through a series of connecting pipes 44. Similarly, gas is made to flow or pass from separation tank 32 through the other tanks, in sequence, through a further series of connecting pipes 46. An electrically-operated rotating ball valve 48 is connected to the output of each of the tanks 32, 36, 38, 40 and 42 at one end of pipes 46 and while, at the other end, each of the pipes 46 branches into a plurality of small thin pipes 50 which extend into the corresponding tank. As indicated by circle 46a and circle 50a, the diameter of pipe 46 is greater than that of thin pipes 50.

As noted above, each of the tanks is disposed, as viewed from the left of FIG. 1, at a higher level than the next adjacent tank so as to minimize the quantity of mercury required. Float valves, one of which is indicated schematically at 52, are filled with air to reduce the pressure exerted by the mercury and thus assist the gas to travel upwardly through the collected mercury to the space thereabove. The float valves 52, with their floating balls, control the flow of mercury for each tank. The valves 52 reduce the high pressure of the mercury on the small pipes 50 themselves to enhance the travel of the gas through the mercury. Thin curved pipes corresponding to pipes 50 can also be employed. The curvature of such pipes can be used to reduce the pressure of the mercury thereon in the manner of the curve of a medical thermometer.

As the gas travels through the mercury in the form of bubbles, each bubble will be under high pressure (thirteen times the pressure of water) thereby creating friction and generating heat. The heat increased in the following tanks in sequence, i.e., tanks 36, 38 and 40, and is absorbed in the relatively shallow mercury pool in the last tank 42.

The aforementioned rotary valves 48 associated with the heater tanks 46 control the pressure from the mixing chamber 16 wherein shock waves are produced to assist in injecting the gas and mercury mixture. Preferably, the rotational speed of each valve 48 will differ and the speeds will vary in a predetermined pattern. In a specific implementation, the valve 48 for separation tank 32 will rotate at 960 revolutions per minute (rpm), that for tank 36 will rotate at 480 rpm, that for tank 38 at the 240 rpm, that for tank 42 at 120 rpm, and that for the final tank 40 at 60 rpm. In this way, hammering waves or pulses are created at twice the rate as the previous tank to help in forcing or pushing the gas through the mercury.

The gas from the last tank 42 in the series is transported through piping indicated at 54 to the compressor 10 at the top of the mountain for compression and continuation of the cycle. It will be, of course, appreciated that other units may be located at the top of the mountain along with condenser (compressor) 10 including a liquid reservoir or gas storage tank (not shown) and control valving (not shown). These units may, of course, also include a power supply 10a such as a battery or gasoline driven motor-generator for supplying electrical power to the compressor 10.

As is believed to be evident from the foregoing description of the overall system, in operation, gas under pressure from compressor 10 is routed down through pipeline or supply conduit 14 to the level of unit 12 wherein the gas is under high pressure. The gas is supplied to mixing chamber 16 along with mercury injected by injector unit 26 for mixing and heating by heater 22. The hot mercury-gas mixture is caused to flow, in the form of pulsations or shock waves, to turbine 28 wherein pulses of the mixture impact on the blades 28a of the turbine 28, and thus drive the turbine. The gas and mercury mixture is then collected and transported to the separation tank 32 wherein the gas it separated from the mercury and is caused to bubble through the mercury in the series of heater tanks 36, 28, 40 and 42 thereby creating frictional forces and heating the mercury. The heated mercury is ultimately delivered to the injector 26 for injection into mixing chamber 16 while the separated gas is returned to compressor 10.

Turning now to liquid turbine-generator units 17 mentioned above, these units are installed at regularly spaced points (e.g., every 500 meters in a specific embodiment) along the descent of the supply pipe 14 down, e.g., the mountain and each comprises a liquid turbine 56 and an electrical generator 58 driven by the associated turbine 56. This approach breaks the high pressure generated as the liquefied gas travels down pipe 14 and avoids the serious problem created by the heat that would otherwise be generated by the high pressure flow. The turbines 56 each convert the gravitational force produced by the liquefied gas into a rotational force for driving the associated generator 58. The high pressure supply line or conduit 14 is of a diameter chosen such that the required pressure is produced while the frictional forces exerted on the conduit walls are minimized. The electrical energy produced by generators 58 is then used to provide power for the rest of the system. For example, as indicated in the drawings, electrical power is provided to compressor 10 and to motor control unit 21. Thus, energy produced as the result of differences in elevation is converted into electrical energy to assist in driving the overall system.

Heat is necessary at the end of the process taking place at the bottom of the mountain to convert the liquefied gas into a gaseous state for travel through line 54 back to compressor 10. In the first instance, heat from the liquefied gas supply line 14 is used in driving turbine 28 and to generate surplus energy in accordance with the basic aim of the system as described above. The heat needed is further provided in a natural way, by compression, using the remaining pressure to inject the gas into mercury thereby causing the gas to be heated by the bubbling thereof through the mercury as discussed hereinbefore. The heated gas will then easily travel upwardly and will lose heat during this travel before reaching the compressor 10 at the completion of the overall cycle. Thus, the energy generated at various points along the way is efficiently utilized.

Additional heat for the system is provided by a series of heat exchangers 60 which derive heat from relatively warm sea water, indicated at 62, or another body of such water. This part of the system can be similar to the system disclosed in U.S. Pat. No. 5,400,619 (Husseiny et al) and can use the principles of that patent to provide potable water, with the compressor of the Husseiny et al patent being located at the upper part of the mountain. The pipes 64 between the heat exchangers 60 preferably increase in diameter so as to accommodate the high pressures generated. Alternatively, pressure extracting tanks (not shown) can be located between the heat exchangers.

The problem of the heat created as the liquefied gas travels down the supply pipe 14 could also be combated by cooling of the pipe 14. This can be done by employing an outer shell or conduit and using some of the gas from the main conduit to provide cooling of the space between the main and outer conduits. A liquid turbine at the bottom of the mountain would then be used to generate electrical energy for the heater and other electrical uses.

It is also noted that cooling rather than heating can be provided by reversing the heating process described above. Mercury can be used to compress the gas and drawing or sucking the gas through the mercury enables the use of the low boiling point gasses employed in conventional cooling systems. The cost of such cooling can be decreased and the needed compressible forces reduced because use is made of the natural compression exerted by mercury on a single bubble.

It will be appreciated that there is a significant difference between the energy consumed in recovering the helium gas, as here, and the refining of helium, since the latter generally requires purifying a mixture of rare gases and this takes substantial energy. In the plastics industry, a conventional four stage liquefying system is used to recover helium gas at low cost.

Although the present invention has been described to specific exemplary embodiments thereof, it will be understood by those skilled in the art that variations and modifications can be effected in these exemplary embodiments without departing from the scope and spirit of the invention.

What is claimed:

1. A system for generating energy using the difference in elevation between a relatively high elevation and a relatively low elevation, said system comprising:

compressor located at the relatively high location for compressing a vapor form of a working medium into a compressed gas;

a first conduit for conveying said compressed gas to said relatively low elevation;

mixing chamber at said relatively low elevation;

mercury supply means for supplying mercury to said mixing chamber;

control means connected to said first conduit for supplying pulses of said compressed gas to said mixing chamber for mixing with said mercury to produce a mercury-gas mixture;

a turbine having turbine blades;

injecting means for injecting pulses of said mercury-gas mixture into said turbine so as to impact against said turbine blades and drive the turbine;

separator means for recovering the mercury and gas from said turbine and for separating the gas from the mercury;

connector means for conveying mercury separated from said gas to said mercury supply means;

a further conduit for conveying gas separated from the mercury to said compressor; and a plurality of liquid turbine-generator units each respectively located at different elevations along said first conduit between said relatively high elevation and said relatively low elevation, said units each comprising a liquid turbine driven by said compressed gas and a generator driven by the associated liquid turbine for supplying power to the remainder of the system.

2. A system for generating energy as claimed in claim 1 wherein said control means comprises a control valve connected to said conduit and having an open state wherein said compressed gas is supplied to said mixing chamber and a closed state wherein said compressed gas is blocked from said mixing chamber, and an electrical control means for providing periodical opening and closing of said control valve to generate said pulses.

3. A system for generating energy as claimed in claim 2 wherein said valve comprises a rotary valve.

4. A system for generating energy as claimed in claim 3 wherein said mixing chamber includes an internal electric heater for heating the mercury and gas supplied to said chamber.

5. A system for generating energy as claimed in claim 1 wherein said injecting means includes a connection between said mixing chamber and said turbine for increasing the rate of injection of the mercury-gas mixture into said turbine.

6. A system for generating energy as claimed in claim 1 further comprising heating means for heating the mercury prior to supplying of the mercury to the mixing chamber.

7. A system for generating energy as claimed in claim 6 wherein said heating means comprises at least one heater tank containing mercury, and supply means for supplying gas from said separator means into a bottom portion of said tank such that the gas bubbles up through the mercury in the tank to thereby cause heating of the mercury.

8. A system for generating energy as claimed in claim 7 wherein said separator means comprises a separator tank containing mercury and defining a mercury level, said separator tank including an inlet connected to said turbine, an outlet disposed below said mercury level for supplying mercury to said at least one heater tank, and an outlet at an upper portion of said separator tank for supplying gas to said at least one heater tank.

9. A system for generating energy as claimed in claim 8, wherein at least one heater tank comprises a plurality of interconnected heater tanks arranged in serial relation and disposed at different, increasing elevations, in sequence, beginning with the heater tank connected to said separator tank.

10. A system for generating energy as claimed in claim 9 further comprising a gas pipe connector for connecting each heater tank to the next adjacent heater tank in sequence, and an electrically controlled, cyclically operated rotary valve connected in each gas pipe connection.

11. A system for generating energy as claimed in claim 10 wherein said rotary valves are controlled to cyclically operate at different, decreasing rates beginning with said heater tank connected to said separator tank.

12. A system for generating energy as claimed in claim 11 wherein said rates decrease, in sequence, by a factor of two beginning with said heater tank connected to said separator tank.

13. A system for generating energy as claimed in claim 7 wherein said supply means comprises a connection conduit of a first diameter connected to said separator tank and a plurality of connecting pipes of diameters smaller than said first diameter connected between said connector conduit and said bottom portion of said heater tank.

14. A system for generating energy as claimed in claim 13 wherein each of said pipes includes an outlet end opening into said heater tank and an air filled float valve located at said outlet end.

15. A system for generating energy as claimed in claim 1 wherein said mixing chamber includes an ovoid shaped cavity.

16. A system for generating energy as claimed in claim 15 wherein said mixing chamber includes an ovoid shaped heater therein.

* * * * *